Patented Jan. 5, 1954

2,665,324

UNITED STATES PATENT OFFICE 2,665,324

MANUFACTURE OF STORAGE BATTERIES

Thomas P. McFarlane, Farmington, Conn., assignor to National Lead Company, New York, N. Y., a corporation of New Jersey No Drawing. Application September 2, 1950, Serial No. 183,082

9 Claims. (Cl. 136—26)

This invention relates to the manufacture of lead acid storage batteries and has particular reference to a positive plate material which will "form" more readily.

Present methods of manufacture of automotive starting and lighting batteries are similar in general in the basic steps involved. The pasted grid structures containing lead oxide material are dried, assembled into positive and negative groups, nested together with separators and "formed." In the forming process, in the presence of dilute sulphuric acid, an electric current converts the lead oxide material of the negative plates into sponge lead, while that in the positive plates is converted into lead peroxide. It is well known that while the negative plates form readily, the formation process is relatively inefficient as applied to the positive plate, particularly in the later stages of formation, when a dense layer of the lead sulphate reaction product which exists on the surface of positive plates, interferes with conversion to peroxide. The positive formation efficiency is an inverse function of the concentration of sulphuric acid electrolyte employed and it has, therefore, been customary to form in dilute acid and after formation to change to stronger acid, suitable as an operating battery electrolyte. Except in the case of tank formation, infrequently employed, this has necessitated dumping and refilling battery containers, the preparation of two acid solutions of different concentrations, as well as an additional "conditioning" charge. Attempts to obviate these difficulties or to improve the efficiency of the formation of positive plates, have heretofore been generally unsuccessful.

The object of this invention is to provide a positive plate material which will form in less time and with the expenditure of less electrical energy than heretofore possible. Another object is to obviate the need for two electrolytes of different concentrations. Another object is to eliminate the dumping and refilling operations in the manufacture of storage batteries. A further object is to make unnecessary the conditioning charge.

This invention in its broadest aspects contemplates provision of positive plate active material for lead acid storage batteries which comprises lead oxide and a minor proportion of an organic compound selected from the group generally known as fatty acids and their salts, consisting of saturated and unsaturated monocarboxylic aliphatic acids containing, in the case of saturated acids, from 4 to 16 carbon atoms and in the case of unsaturated acids, from 4 to 18 carbon atoms, and their lead, sodium and potassium salts. The organic compound is present in the active material in amounts up to 2%. The amount of organic material present, however, may be varied to some degree depending upon the manner in which the compound is added to the lead oxide material. The organic compound may be added by employment of either of two general methods; first, the organic compound may be admixed with the lead oxide material prior to incorporation of the active material into the battery plate grid structure. Under these conditions, it is necessary that the organic compound be intimately mixed with the lead oxide material and should be present in amount preferably from 0.2% to 2%. Alternatively, the organic compound may be added to the lead oxide active material by applying a solution or suspension thereof to the surface of the lead oxide material after this has been pasted in the battery plate grid structures. The solution containing the organic compound, which may be in alcohol, water or some other suitable solvent, is applied to the active material pasted surface by any convenient means such as brushing, spraying or dipping. Under these conditions, the amount of organic compound incorporated in the lead oxide material will generally be lower than when the compound is admixed with the lead oxide material prior to pasting in the grids. When a solution of the organic compound is employed, the amount deposited is concentrated on the surface of the lead oxide, and may in part penetrate the surface and be dispersed in the sub-surface lead oxide.

The lead oxide portion of the positive plate active material may comprise wholly litharge or mixtures of litharge with red lead. The organic compound may comprise, as stated above, fatty acid or its lead, sodium or potassium salt. Among those which have been found to be effective are the acids and salts of such acids as butyric, capric, nonanoic, lauric, myristic, palmitic, 2-ethyl hexoic, oleic and linoleic. It is apparent that the presence of groups containing the anion (R—COO)—, function to improve the conversion of lead oxide to lead peroxide in an anode with a sulphuric acid as an electrolyte. This function operates even in relatively strong electrolyte so that a concentration which will serve as an operating battery electrolyte may be employed to advantage during formation.

All of the above-mentioned acid groups have been found to clear the positive plates of residual, dense lead sulphate, generally allowing complete formation to take place in a cell, using an electrolyte of a specific gravity of from 1.230 to 1.300, for instance, depending on the type of separators used. In such a case, the final gravity of the electrolyte will generally be about 1.280.

Completed batteries manufactured employing positive plates containing the active material of this invention may be formed and conditioned in operating strength electrolyte directly in one charging step. Such procedure eliminates the double forming and conditioning steps heretofore employed. However, under certain conditions, it may be advantageous to charge the battery in two stages and when this is done, the active material of this invention provides formation and clearing, which is faster, of the positive plate material. Employment of the positve plate material of this invention permits formation charging in less time than heretofore resulting in substantial manufacturing economy and saving of electric current.

The following examples will serve to illustrate selected embodiments of the invention and unless stated, plates were prepared with a paste employing uncalcined litharge containing about 30% finely divided metallic lead, along with standard negative plates and microporous rubber separators.

Example 1

A standard battery, the positive plate mix of which contained in addition to uncalcined litharge, admixed therewith 1.2% by weight on a dry basis, of monobasic lead 2-ethylhexoate, was prepared and the cells filled with a sulphuric acid solution of 1.060 specific gravity and placed on charge at a rate of 2.14 amperes per positive plate. After 17 hours of charge, the battery was found to be formed and the cells were then dumped of forming acid and filled with sulphuric acid electrolyte of 1.360 specific gravity and again placed on charge at a rate of 0.70 ampere per positive plate. After an additional 16 hours, the battery was found to be fully formed and conditioned.

In comparison, a standard battery similar to the above except that no organic material was added to the positive plate mix, required 20 hours to form and 16 additional hours to be fully formed and conditioned.

Example 2

A storage battery cell the positive plate mix of which contained uncalcined litharge admixed with 0.6% by weight on a dry basis, of monobasic lead 2-ethylhexoate, was prepared and the cell filled with a sulphuric acid solution of 1.230 specific gravity and formed by charging at a rate of 2.14 amperes per positive plate. After 34 hours, the cell was fully formed and required no additional conditioning charge.

In comparison, a cell with positive plates containing no added organic material but otherwise similar was similarly filled and placed on formation. After 34 hours, approximately 75% of the surface of the positive plates was covered with a layer of lead sulphate, showing that these plates were badly underformed.

Example 3

The standard battery materials described in the above examples were again used. The unformed positive plates containing uncalcined litharge only were dipped prior to nesting for 10 seconds in a 5% solution of lauric acid in alcohol. The dip was so arranged that only one half of each positive plate was covered with the solution. In this way, the half which was not exposed to the solution acted as a control for the experiment. The cell was filled with sulphuric acid electrolyte of 1.230 specific gravity and placed on formation at a rate of 2.0 amperes per positive plate for 28 hours. At this point, the positive plate portions which had been dipped were essentially free of visible lead sulphate whereas in the case of the undipped portions, approximately 90% of their surface was covered with lead sulphate.

Example 4

Example 3 was duplicated replacing lauric acid with sodium 2-ethyl hexoate. At the end of 17½ hours of formation, approximately 15% of visible lead sulphate remained on the surface of the dipped portions of the positive plates while in the case of the undipped portions, approximately 80% of their surface was covered with lead sulphate.

Where the positive plate mix contains a proportion of red lead, 25% being an amount sometimes used, formation time is somewhat shortened in any strength electrolyte. Even with 25% red lead in the positive oxide, the practice of this invention will facilitate formation by reduction of the time necessary to accomplish complete formation.

Example 5

Two positive paste mixes were made, each consisting of an oxide blend of 25% red lead and 75% uncalcined litharge. The red lead used contained 75% true red lead, the remainder being litharge. To one of these mixes there was admixed 0.6% monobasic lead, 2-ethyl hexoate on a dry basis while the other contained no added organic material.

The two mixes were then pasted into grids and batteries prepared, using wood separators. The cells were filled with 1.100 specific gravity sulphuric acid electrolyte and were placed on formation at a rate of 1.7 amperes per positive plate. After 20 hours of charge the battery containing positive plates made with the monobasic lead 2-ethyl hexoate was fully formed. However, 22 hours were required to form the battery with positive plates containing no added organic material.

The group of fatty acid compounds effective in the practice of this invention consists, as has been heretofore described, of saturated and unsaturated monocarboxylic acids and their lead, sodium and potassium salts. The acids themselves have been found effective as have the lead compounds without otherwise affecting the life or characteristics of the storage battery. It may be that the compounds of the acids are converted to the respective free acids when the battery is charged or operated so that the acids and their lead compounds are substantially equivalent in their action according to this invention. Other metallic compounds of the acids described may be employed. However, with the exception of sodium and potassium, other metals most generally have a deleterious effect on the finished battery. Certain metallic cations are well known to "poison" the battery which will result in impaired life and capacity. In the case of sodium and potassium compounds employed according to the instant invention, these salts are not present in sufficiently great amounts to adversely affect the characteristics of the battery and they may be employed effectively to hasten formation of the positive plate.

The effectiveness of dipping versus compounding or admixing, while varying to an extent, was found to be generally of the same order. A number of organic compounds were investigated according to the procedure described in the above examples, all of which compounds contained the anionic radical (R—COO)—.

The following fatty acid compounds were found in each case to be effective in giving better positive formations than controls with no organic additions:

Normal lead butyrate
Heptoic (heptanoic acid)
Dibasic lead heptoate
Dibasic lead caprylate
2-ethyl hexoic acid
Monobasic lead 2-ethyl hexoate
Sodium 2-ethyl hexoate
Nonanoic acid (pelargonic)
monobasic lead nonoate
Capric acid
Undecylic (hendecanoic) acid
Lauric acid
Myristic acid
Palmitic acid
Oleic acid
Linoleic acid It will be evident from the above that the present invention has the advantage of increasing efficiency in the formation of positive plates. If desired, a single electrolyte of operating strength may be used with a single charge enabling formation-conditioning to be accomplished with less overall electrical current consumption.

While this invention has been described and illustrated by the examples shown, it is not intended to be strictly limited thereto and other modifications and variations may be employed within the scope of the following claims.

I claim:

1. A positive plate active material for lead acid storage batteries comprising lead oxide and a minor proportion of an organic compound selected from the group consisting of 2-ethyl hexoic acid and its lead, sodium and potassium salts.

2. A positive plate active material for lead acid storage batteries comprising lead oxide and up to 2% of a compound selected from the group consisting of 2-ethyl hexoic acid and its lead, sodium and potassium salts.

3. Active material according to claim 1 in which the organic compound is monobasic lead 2-ethyl hexoate.

4. Active material according to claim 1 in which the organic compound is sodium 2-ethyl hexoate.

5. A positive plate active material for lead-acid storage batteries comprising predominantly lead oxide, and about 0.05% to about 2% of an organic compound selected from the group consisting of saturated monocarboxylic aliphatic acids having 4 to 16 carbon atoms and unsaturated monocarboxylic aliphatic acids having 4 to 18 carbon atoms, and their lead, sodium and potassium salts.

6. A positive plate active material for lead-acid storage batteries comprising predominantly lead oxide, and about 0.6% of an organic compound selected from the group consisting of saturated monocarboxylic aliphatic acids having 4 to 16 carbon atoms, and unsaturated monocarboxylic aliphatic acids having 4 to 18 carbon atoms, and their lead, sodium and potassium salts.

7. A positive plate active material according to claim 5 in which the organic compound is dibasic lead caprylate.

8. A positive plate active material according to claim 5 in which the organic compound is lauric acid.

9. A positive plate active material according to claim 5 in which the organic compound is sodium 2-ethyl hexoate.

THOMAS P. McFARLANE.

References Cited in the file of this patent

UNITED STATES PATENTS

| Number | Name | Date |
| --- | --- | --- |
| 588,905 | Hammacher | Aug. 24, 1897 |
| 708,695 | Christian | Sept. 9, 1902 |
| 935,316 | Morrison | Sept. 28, 1909 |
| 1,508,732 | Thornley et al. | Sept. 16, 1924 |
| 2,033,587 | Pearson | Mar. 10, 1936 |

OTHER REFERENCES

Lyndon, "Storage Battery Engineering," page 185, 1911, McGraw-Hill Book Co., Inc.